July 21, 1964  R. J. PRESTON  3,141,952
ELECTRONIC SEAM FOLLOWER
Filed Feb. 1, 1961  3 Sheets-Sheet 1
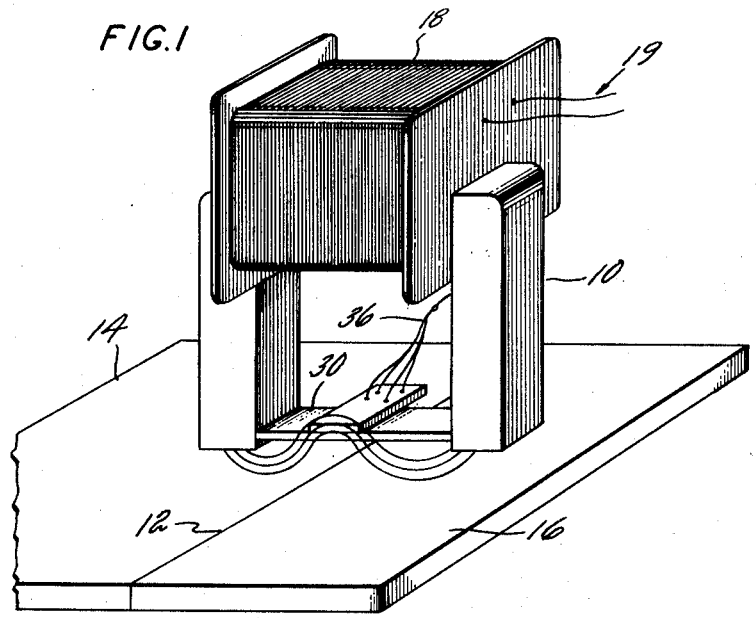
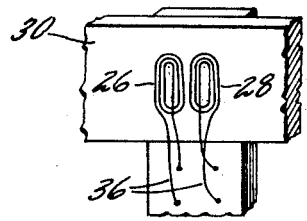
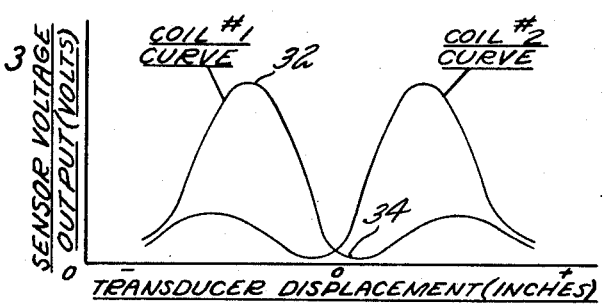
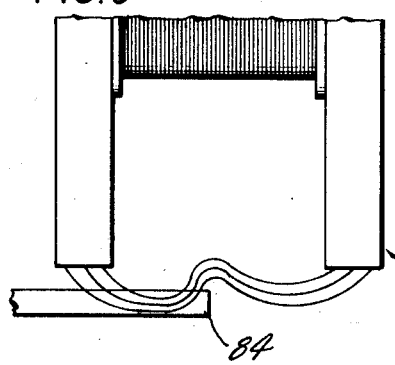
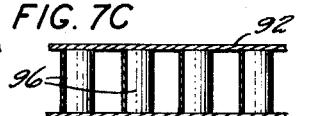
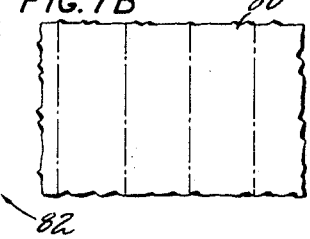
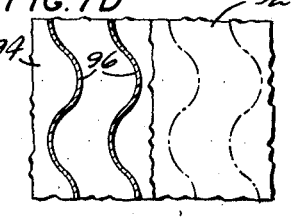
INVENTOR
RICHARD J. PRESTON
BY Donald H. Bradley
AGENT

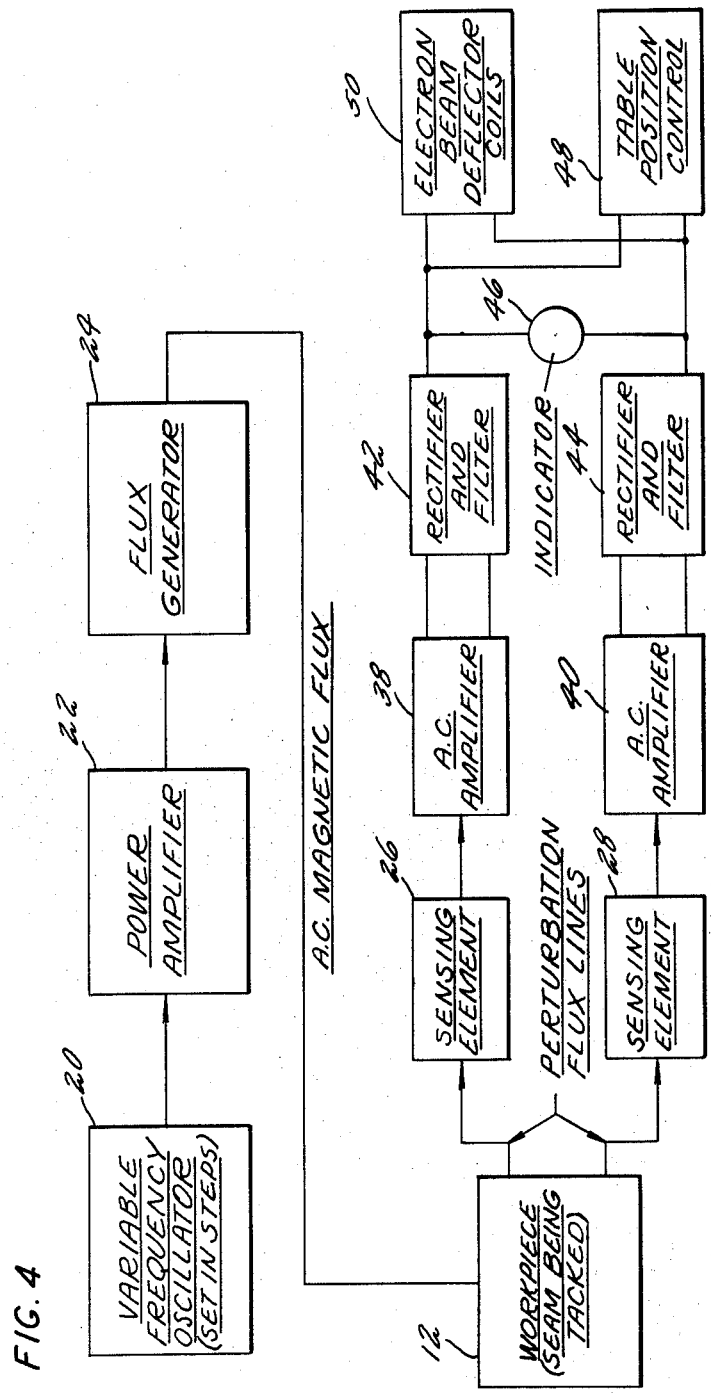

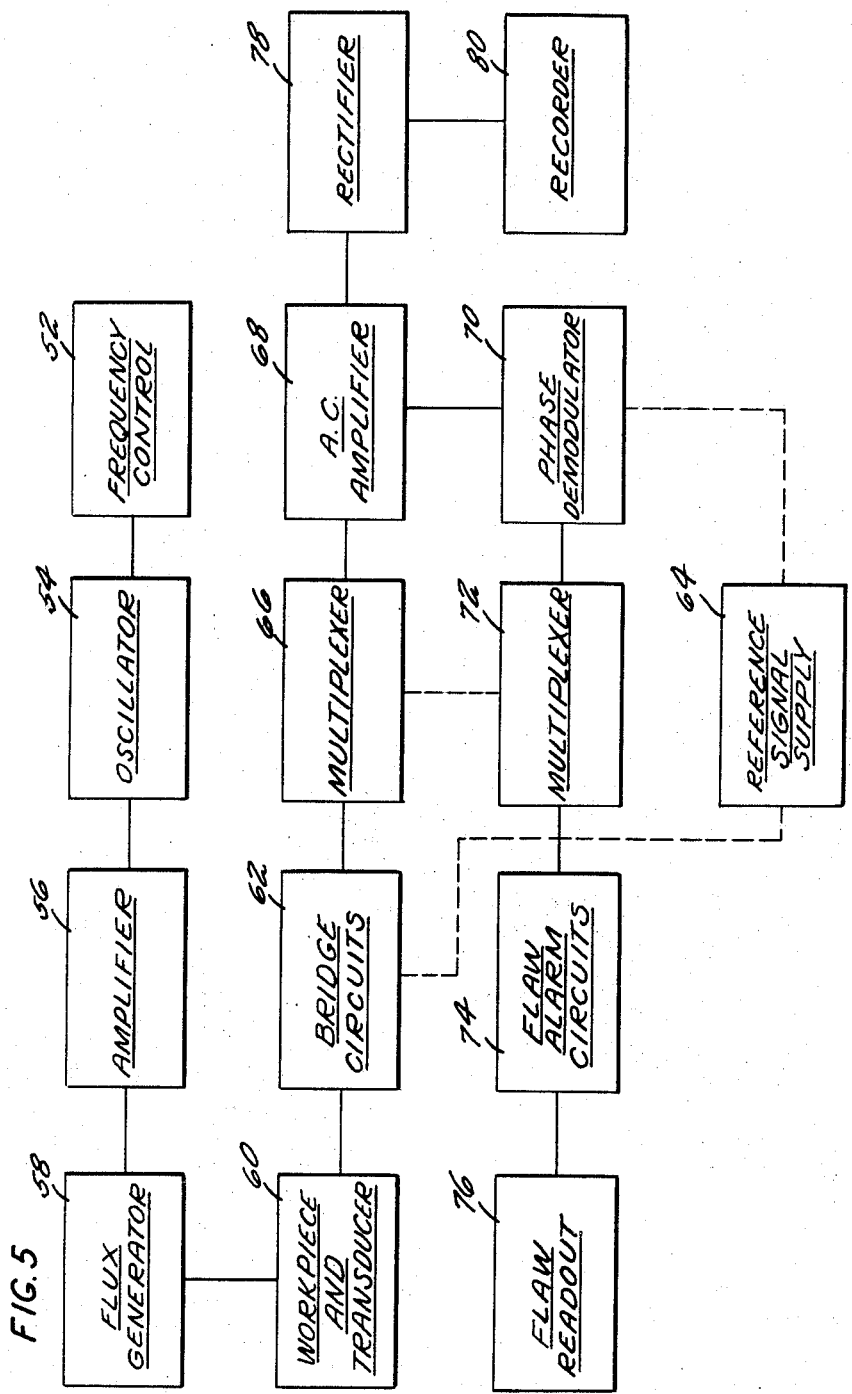

3,141,952
ELECTRONIC SEAM FOLLOWER
Richard J. Preston, Springfield, Mass., assignor to United
Aircraft Corporation, East Hartford, Conn., a corporation of Delaware
Filed Feb. 1, 1961, Ser. No. 86,442
5 Claims. (Cl. 219—125)

This invention relates to a system for sensing flaws or discontinuities in metallic materials, and particularly to a novel method of tracking a discontinuity such as a seam in metallic materials.

There has been an urgent need in industry for a simple and inexpensive method of determining the presence of imperfections or discontinuities in metallic materials. For example, after fabrication of a sheet of a metallic material such as brass or steel, it is very important that any imperfections in the material itself be detected. These imperfections may be internal or external. One method of accomplishing this result is by X-ray means, commonly used in industry at present. The X-ray technique, however, is prohibitively expensive and time consuming, in addition to the physical dangers inherent in dealing with X-ray equipment. Another method of sensing imperfections in metallic materials is that of directing an electrical current through the material and sensing deviations in the magnetic field created by the current with sensing apparatus located adjacent the material. A major disadvantage of this method is that electrical contact with the material is necessary to generate a current within the material itself, with the result that this method is quite slow and cumbersome.

A method of sensing imperfections used by many at present is the use of eddy currents whereby sensing coils are energized with an alternating current potential and the electromagnetic flux generated thereby is directed into the surface of the metallic material. The impedance of the coils is changed by virtue of disturbing effects caused by eddy currents generated in the material. A crack or seam under the magnetic influence of the coils would afford a change in the eddy current effects, thereby resulting in a detectable change in the impedance of the coils. The change in impedance could then be sensed in a bridge circuit read-out system. The major disadvantage in this system is that the system is unable to distinguish between a crack or imperfection in the material and a change in the distance from the coil to the metal surface. In addition, the eddy current effect is very significant only on or close to the metal surface and diminishes quite rapidly as the distance from the metal increases.

Another method of flaw detection in widespread use today is the ultrasonic technique wherein sound waves are transmitted into a metal casting or solid piece of material and the presence of flaws is determined by reflection or interruption of the sonic waves. Drawbacks to this system include the required contact between the transducer and the workpiece which causes difficulty under rough surface conditions, the critical nature of transducer orientation with respect to the surface which causes great difficulty in proper interpretation of reflected wave data, and the inability of this technique to distinguish between a corroded and a solid metal or to detect such an interface. Pressure vessel inspection requires for safety an adequate inspection technique and present methods are destructive and statistical in nature due to the unreliability of ultrasonic and other inspection systems.

The novel system of this disclosure has many advantages and unique characteristics. While the system may be used to great advantage for scanning metallic materials and sensing flaws therein, an extremely important application is that of seam following, whereby a particular discontinuity, the seam formed by butting together or joining two or more metallic members, is tracked for the purposes of cutting, welding, or pattern making, among possible applications. Edge following for contour work is another important application as a method of eliminating unreliable and inaccurate roller and mechanical followers. As a practical embodiment of this invention, a welding operation will be described, but it should be noted that this invention need not be limited to welding.

This system is adapted for use in automatic control systems. An example is the welding of seams of components such as nuclear fuel sub-assemblies. An electron beam machine such as is disclosed in U.S. Patent No. 2,793,281 may be actuated in reponse to signals produced by the seam follower of this invention. One of the prime advantages gained by this type of system is the ability to weld in an inert atmosphere.

This invention is based on a physical phenomenon wherein a magnetic flux perturbation will occur where there is a discontinuity in a metallic member when an alternating magnetic flux is directed across the member. The perturbation occurs as a symmetrical hump in the flux field pattern which extends outside the material on both sides of the discontinuity. The extreme apex of the hump is directly centered over the discontinuity and the apparatus described herein will detect this hump precisely. The discontinuity will be described as a seam occurring at the edges of two butted metallic members.

An object of this invention is a system for sensing discontinuities or irregularities in metallic materials.

Another object of this invention is a method of tracking a seam formed by joining two or more metallic members.

A further object of this invention is a method of welding a seam formed by joining two or more metallic members.

Another object of this invention is the actuation of a controlled element in response to position signals generated by the seam follower of this invention.

A further object of this invention is a system for sensing a discontinuity in a metallic material which does not require any external electrodes or electrical current to contact or be passed through the materials.

Another object is a system for tracking totally obscured seams.

A further object of this invention is a seam follower which is able to track seams in any metallic material, ferrous or non-ferrous and magnetic or non-magnetic.

Another object of this invention is a method of sensing a discontinuity in a metallic material which does not require any physical contact with the workpiece.

A further object of this invention is a novel seam following apparatus including a transducer which will generate signals indicative of the relative position of the seam being followed.

Another object of this invention is a system for following the edge of a metallic material and producing a control signal to thereby actuate other devices in response thereto.

Another object of this invention is a novel seam follower which is insensitive to minor variations in distance between the transducer and the workpiece.

A further object of this invention is a system for sensing a discontinuity in metallic materials which is not affected by environmental conditions such as high temperatures, welding arc pickup, or soft X-rays and gamma rays.

Another object of this invention is a system for sensing and recording discontinuities in a metallic material.

A further object of this invention is a system for sensing discontinuities in a metallic material and for providing an alarm upon the occurrence of a discontinuity.

Another object of this invention is a system for scanning the entire surface area of a metallic material and recording the history of irregularities found therein.

A further object of this invention is a system for scanning the entire surface area of a metallic material by using a plurality of flux generators and transducers.

These and other objects and a fuller understanding of the invention may be had by referring to the following description and claims taken in conjunction with the accompanying drawings in which:

FIG. 1 shows the preferred embodiment of the seam following apparatus; and

FIG. 2 is a detailed showing of the transducer elements of FIGURE 1; and

FIG. 3 is a graphic illustration of the voltage output of the transducer; and

FIG. 4 is a block diagram showing the seam follower connected with a welding apparatus; and FIG. 5 is a block diagram showing the apparatus of this invention used in scanning a metallic material; and FIG. 6 shows the flux pattern when the edge of a material is being tracked; and FIGS. 7A–D illustrate particular types of seams which may be detected by the apparatus of FIGURE 1.

Referring now more particularly to FIGURE 1, a U-shaped core 10 of magnetic material is positioned over a seam 12. The seam 12 may be formed by butting together two pieces of metallic material 14 and 16. A seam or joint may also be formed by joining two or more pieces of material at right angles, or in any contiguous relationship. Solenoid coil 18 is mounted on the core 10 and energized preferably with a sinusoidal voltage from an oscillator and a power amplifier through leads 19. In FIGURE 4 the oscillator is shown as block 20 and the power amplifier as block 22 for energizing the entire assembly of core 10 and coil 18 shown as flux generator 24. The variable frequency oscillator 20 may be set in steps to provide a fixed number of frequencies to power amplifier 22.

The frequency of the oscillator is adjusted to obtain maximum effects for each different class of metallic materials. This frequency tuning is due to the apparent resonance of each metallic material. The frequency also affects the depth of penetration and the calibration of the device as to the location and size of flaws in its application to flaw detection. For example, Table I shows the optimum frequency for a few representative materials.

*Table I*

| Metal: | Optimum frequency, kilocycle |
|---|---|
| Aluminum | 3.4 |
| Cold rolled steel | 9.7 |
| Phosphor Bronze | 11.0 |
| Zirconium | 17.0 |
| Brass | 23.0 |
| Beryllium copper | 40.0 |
| Stainless steel | 42.0 |

It can be seen that a material such as aluminum has an optimum frequency much less than that for stainless steel.

Referring again to FIGURE 1, with the U-shaped core 10 is positioned over the seam, a magnetic flux is generated through the metallic materials and across the seam 12. Where the seam is present a magnetic flux perturbation in the form of a symmetrical hump occurs in the flux pattern and extends outside the material on both sides of the metallic material. Since the extreme apex of the hump is directly centered over the seam, a non-ambiguous transducer which may be in the form of two flat spirially wound pickup coils 26 and 28 is positioned to sense the flux perturbations. The pickup coils 26 and 28 may be wires attached to a connecting member 30 of insulating material which joins the two legs of the U-shaped core 10, as shown. The pickup coils 26 and 28 may be printed on the connecting member 30. The coils may be spiral shapes, but, it has been found that an elongated shape as shown in FIGURE 2 gives greater sensitivity. The distance between the coils and the orientation relative to the material may be varied depending on the particular use of the apparatus.

The transducer for sensing the flux perturbations is normally positioned in the plane of the poles of the core 10 and will normally be centered between the core poles, but, any other arrangement may be used. The transducer should be positioned as close as possible to the material for maximum pickup, but, slight variations in the distance of the transducer above the seam will be materially affect the sensitivity of the system.

FIGURE 3 shows a representative curve of the output characteristics of a pair of pickup coils as a function of displacement from the seam. With two such pickup coils, the flux intensity through each coil is equal only at positions centered exactly over the seam or completely off the seam. A condition where the transducer is slightly off the seam will cause the output of one pickup coil to decrease and that of the other to increase.

The curve of FIGURE 3 is representative of the transducer output at a particular excitation frequency chosen to obtain a maximum signal change versus cross-seam movement. This particular curve indicates a relatively steep slope between points 32 and 34, this being a desirable characteristic and giving a high sensitivity. The exact curve will change somewhat with different metals and different frequencies.

With the two-coil transducer described, the voltage sensed by each coil is along the somewhat linear portion of the curve between points 32 and 34 from the peak level. This arrangement thus provides the means for a non-ambiguous read-out and control system.

The pickup coils 26 and 28 are each connected to an A.C. amplifier through leads 36, as shown in FIGURES 1 and 2. The A.C. amplifiers are indicated as blocks 38 and 40 in FIGURE 4. After amplification, the output of each pickup coil is rectified and filtered, as shown by blocks 42 and 44. The outputs are then compared as, for example, by indicator 46, which may be a simple zero center meter. When the transducer is directly over the seam the two outputs are equal and will cancel each other. As the metallic material is moved longitudinally, relative to the transducer, the seam may start to deviate. The output in this case will increase from zero with a polarity either negative or positive, indicative of the direction of deviation. The amplitude of the output will be proportional to the distance of the transducer from the center of the seam.

For manual systems, an operator may manually move either the transducer assembly or the metallic material to keep the transducer centered over the seam by observing the signal from indicator 46 and responding accordingly.

In an automatic control system, indicator 46 may be eliminated and the output signal may be fed directly to a servo system for centering the transducer over the seam. For example, numeral 48 indicates a table position control for laterally moving the workpiece until a zero or null signal is obtained. It is obvious that the transducer apparatus may be moved instead of the workpiece.

The seam follower may readily be used in conjunction with a welding machine such as an electron beam machine for welding the seam which is being tracked. The electron beam machine may be fixedly attached to the transducer or may be independently focused. As shown by the block 50, the output may be directed to the electron beam deflection coils to laterally move or focus the electron beam machine together with the table position control 48. In this way, the focused beam from the electron beam machine will follow the seam and weld the seam automatically.

It should be noted that other controlling devices may be used with this system in place of the welding machine. For example, pattern cutting, contour milling of both two and three dimensional types, tracing, or other controlled systems may be used.

Another application of this invention is in "blind hole detecting." If it is desired to line up a hole in one sheet of metallic material with another sheet of material, for example for the insertion of a bolt, the apparatus described would be able to sense the discontinuity caused by the hole and perform the function adequately limited only by the thickness of the materials and the sensitivity of the transducer.

It is also possible to use the seam follower to track the edge of a metallic material. In FIGURE 6, a core of magnetic material 82 is positioned over the edge of a metallic material 84. A pair of transducers are fixed between the ends of the core as previously described. The flux perturbations will occur at the edge of the material, but will not be symmetrical as with a butted seam. The flux will take the shape as shown in FIGURE 6 with the portion of the flux occurring outside the material not returning to the level which it assumed in passing through the metallic material. This occurs because the flux will take the path of least resistance. To compensate for the lack of symmetry of the flux, a biasing signal must be added to one of the transducers, and thus balance the signals from the transducers only when the transducers are centered over the edge of the material. The amount of the bias will vary with the frequency of the A.C. signal used to induce the flux and with the particular material used.

It is not necessary that a seam be formed by joining two pieces of metallic material. The transducer has proven capable of sensing the flux perturbations from a scratch or scribe mark made in the surface of the metallic material. Nor need the scribe mark be on the face of the material adjacent the transducer, for the system is capable of sensing the scribe mark through relatively thick pieces of metallic material. Obviously as the depth of the scribe mark increases, the more sensitive will be the transducer apparatus. The seam may also be formed by joining two or more metallic materials at angles other than 180°. If a joint or discontinuity is formed, a flux perturbation will occur, and only the sensitivity of the transducer will limit the application of this invention.

One of the prime features of this invention is the extreme sensitivity of the transducer which allows the seam to be tracked even though the transducer is at a relatively great distance above the seam. The transducer is relatively insensitive to variations in the distance between the seam and the transducer, an advantage which avoids the difficulties encountered using the eddy current type of seam follower.

FIGURE 5 shows how the basic seam follower apparatus can be used to sense any kind of discontinuity in a sheet of metallic material. A plurality of cores, each having an associated transducer, may be physically connected together either in a single row or staggered so that the entire lateral dimension of the sheet of material under consideration may be sensed at one time. The cores and transducers may be fixed while the sheet of material is moved longitudinally relative to the cores, or the sheet of material may be fixed while the core and transducer assembly is moved longitudinally across the material. The former method appears preferable. Referring to the figure, adjustment of frequency control 52 selects the optimum A.C. frequency for use with the particular material and oscillator 54 is adjusted accordingly. The A.C. signal is amplified as necessary in amplifier 56 and directed to the coils surrounding the cores, the entire assembly being shown as flux generator 58. The flux from the plurality of generators is directed through the workpiece material and any discontinuities or flaws in the material will be sensed by the particular transducers associated with the core adjacent the discontinuity shown as block 60. Since the object here is merely to detect the presence of any discontinuities rather than to track a seam, only one coil is necessary for each transducer. Each transducer is connected to a well-known A.C. bridge circuit 62. Each bridge circuit 62 is supplied with an A.C. reference signal from reference signal supply 64, the A.C. reference signal having an adjustable amplitude. If the amplitude of the A.C. output from the transducer 60 is less than the amplitude of the reference signal from 64, a first A.C. output from bridge circuit 62 of one phase is generated. If the amplitude of the A.C. output from transducer 60 is higher than the amplitude of the reference signal from 64, indicating a flaw in the material, an A.C. output from bridge circuit 62 having a phase 180° away from the first A.C. output is generated. Thus, the phase of the output from bridge circuit 62 will be indicative of the presence or absence of a flaw in the material.

Each bridge circuit 62 is connected to a multiplexer 66. The multiplexer may be a rotating switch device and will transmit the outputs from each bridge circuit consecutively. The number of positions in the multiplexer 66 will be the same as the number of cores and transducers used to scan the material. Assuming that multiplexer 66 is passing the signal from transducer number one, A.C. amplifier 68 will amplify the signal and direct it to a phase sensitive demodulator 70. The demodulator will produce a D.C. output having a polarity, either positive or negative, depending on the phase of the A.C. input, that is, for an A.C. input of one phase a positive output will result, and for an A.C. input 180° removed in phase, a negative output will result. Thus, it can be seen that the polarity of the D.C. output from phase demodulator 70 will be determined by whether or not the A.C. output from the transducer is higher or lower than the A.C. reference from supply 64.

The D.C. signal from phase demodulator 70 is again fed through a multiplexer 72 similar to multiplexer 66. The pair of multiplexers 66 and 72 must be synchronized to switch together, and may in fact be physically enclosed together. Multiplexer 72 connects the demodulator output to a plurality of flaw alarm circuits 74, there being the same number of flaw alarm circuits as there are transducers. The purpose of the flaw alarm circuit is to sense whether the demodulator output is positive or negative, and give an indication when the output shows that a flaw has been sensed by a transducer. The flaw alarm circuit may merely give some signal when a flaw occurs, or may merely indicate the occurrence of a flaw to a flaw read-out apparatus 76 which may be a scope or tape recorder, or may both indicate the flaw and contemporaneously record the entire output on the tape.

The system described thus necessitates a separate bridge circuit and flaw alarm circuit for each transducer, with a multiplexing arrangement to eliminate duplication of amplifiers and demodulators. An obvious advantage to this system is that a plurality of tracks are used and the material must be scanned only once. When a flaw occurs, its position is immediately known because each track has its own flaw alarm circuit. Each track may also be recorded individually. If a less sophisticated system is desired, an arrangement such as rectifier 78 and recorder 80 may be used to record, for example on tape, the entire history of the material. This will not locate the position of the flaw as precisely as the basic system described, but will give an approximate indication of its position. The bridge circuits may also be removed from the system and the recorder 80 will receive the amplitude of the transducer outputs. Other arrangements may readily be conceived which also use the transducer outputs to sense and record the occurrence of flaws in a material.

A single flux generator and transducer may be used to scan across a material to sense the entire area of the material. Either the transducer apparatus or the workpiece may be moved. Numerous mechanical drive systems may be used, such as a leadscrew drive, a ratchet and pawl, a hydraulic cylinder, a rack and pinion, or a Geneva wheel. The transducer and core may be driven across a stationary sheet of material, and when the transducer reaches the end of the material, the material may be advanced slightly to allow the scanning of another portion of the material as the transducer moves back across the material. This process may be continued until the entire area of the material is scanned. In this case a simple amplifier-rectifier and recorder may be connected to the transducer to record the output from the transducer. A flaw alarm circuit may be incorporated as before, sensitive to the amplitude of the transducer output.

A more accurate record could be provided by incorporating a position detector to sense the instantaneous position of the transducer. The rectified transducer output would then be fed to a standard X–Y recorder, and the recorder would be connected to the position detector to complete the loop. The position detector would thus feed accurate position information to the recorder, and a continuous accurate record could be kept of the transducer output.

It is apparent that a single core and transducer or a plurality of cores and transducers or a single large core and a plurality of transducers could be used in conjunction with any of the functions described.

An important application of this invention is the welding of a corrugated or honeycomb material between two panels of material. For example, in the formation of a wing structure in an aircraft, structural rigidity and strength are obtained by the addition of ribs between the upper and lower wing surface panels. These ribs may take the form of corrugations or honeycomb structures. FIGURE 7A is a view of a wing panel showing the top and bottom wing surface panels 86 and 88 and a corrugated metallic structure 90 positioned within the wing to join the top and bottom panels and thereby strengthen the wing. FIGURE 7B is a view looking up at the bottom of the wing structure of FIGURE 7A and showing the line formed where the corrugation and bottom panel meet. The seam follower may be connected with welding apparatus such as an electron beam machine, and the seam formed by the junction of the corrugated material and the wing panel may be detected from the outside portion of the wing panels by the seam follower and the seam welded from this position by the welding apparatus. It is thus apparent that the seam follower is not limited to tracking visible seams formed by joining two pieces of material at the edges of the material, but can also be used to track seams formed by joining or butting materials at right angles or in the form of a "T," or beneath surface of the material.

FIGURES 7C and 7D illustrate another form of corrugation which may be used. FIGURE 7C is a view of a wing panel showing the top and bottom wing panels 92 and 94 and the corrugated center structure 96, while FIGURE 7D is a top view of the same wing area showing the profile formed by the meeting of the top panel and the corrugated center structure. The left portion of FIGURE 7D shows the top view of FIGURE 7C with the top panel removed to clearly illustrate the exact shape of the corrugations. The seam thus formed may be detected and welded by use of the seam follower positioned outside the wing surfaces as previously described.

It is apparent that other types of corrugation may be used to provide the necessary strength. Also, a honeycomb center structure may be used in place of the corrugated material. As long as the seam exists it can be sensed by the seam follower apparatus, limited only by the thickness of the material and the sensitivity of the transducer. The seam need not be visible, but may be covered by a cap. Neither is it necesary that the materials be in actual physical contact. A space or interstice between the materials will not affect the performance of the sensing apparatus, since it has previously been shown that the edge of a material may be detected and followed.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and the scope of the invention as hereinafter claimed.

I claim:

1. Apparatus comprising a core having at least two pole pieces with major vertical axis, means energized by a source of alternating voltage for generating an alternating magnetic flux between the ends of said pole pieces, means for positioning the ends of said pole pieces adjacent the surface of a metallic workpiece to thereby direct said magnetic flux through a portion of said workpiece, and a single pickup coil electrically insulated from said core and positioned adjacent said workpiece substantially between said pole pieces in a plane passing through the major axes of both pole pieces for sensing flux intensity variations occurring in the flux field pattern adjacent said workpiece due to discontinuities in said workpiece.

2. Apparatus as in claim 1 in which said pickup coil is positioned in a plane defined by the ends of said pole pieces adjacent the workpiece and fixedly connected with said core for movement therewith.

3. Apparatus as in claim 2 and including two pickup coils electrically insulated from said core and positioned side by side between said pole pieces in the plane passing through the major axes of both said pole pieces, each of said coils being responsive to flux intensity variations occurring in the flux field pattern adjacent said workpiece and producing a signal proportional to the displacement of each said coil from a discontinuity in said workpiece.

4. Seam tracking apparatus comprising a U-shaped core of magnetic material having two pole pieces with major vertical axes, a coil energized by a source of alternating voltage and connected with said core for producing an alternating magnetic flux between the ends of said pole pieces, a workpiece formed by butting together two portions of a metallic material to form a seam at the junction of said two portions, means for positioning the ends of said core adjacent sad workpiece whereby said magnetic flux is directed through at least a portion of said workpiece including said seam, a symmetrical flux distortion occurring adjacent said seam as said flux traverses said seam, first and second pickup coils positioned side by side between said pole pieces in a plane passing through the major axes of both said pole pieces, said coils being electrically insulated from said core and fixedly connected for movement therewith, each of said coils being responsive to the intensity of the flux distortion occurring adjacent said seam and producing a signal in response thereto, means for comparing said signals together to produce an error signal, and servo means responsive to said error signal for centering said pickup coils over said seam.

5. Tracking apparatus comprising a U-shaped core of magnetic material having two pole pieces with major vertical axes, a coil energized by a source of alternating voltage and connected with said core for producing an alternating magnetic flux between the ends of said pole pieces, a workpiece of metallic material having an edge, means for positioning the ends of said pole pieces adjacent said workpiece whereby said magnetic flux is directed through at least a portion of said workpiece including said edge, a flux distortion occurring adjacent said edge and for a distance beyond said edge, first and second pickup coils positioned side by side between said pole pieces in a plane passing through the major axes of both said pole pieces, said coils being electrically insulated from said core and fixedly connected for movement therewith, each of said coils being responsive to the intensity of the flux distortion occurring adjacent said edge and producing a signal in response thereto, biasing means for supplying a biasing signal to one of said pickup coils to thereby compensate for the unsymmetrical flux field occurring beyond the edge of said workpiece, means for comparing said coil signals together to produce an error signal, and servo means responsive to said error signal for centering said pickup coils over said edge.

References Cited in the file of this patent

UNITED STATES PATENTS

| | | |
|---|---|---|
| 2,617,854 | Valkenburg | Nov. 11, 1952 |
| 2,679,620 | Berry | May 25, 1954 |
| 2,684,464 | Hastings et al. | July 20, 1954 |
| 2,921,179 | Anderson | Jan. 12, 1960 |
| 2,971,079 | Sommeria | Feb. 7, 1961 |
| 3,040,164 | Pevar | June 19, 1962 |
| 3,076,889 | Enk | Feb. 5, 1963 |